Aug. 31, 1943.  J. R. GREENE ET AL  2,328,271
CLAMPING TOOL
Filed Sept. 29, 1941
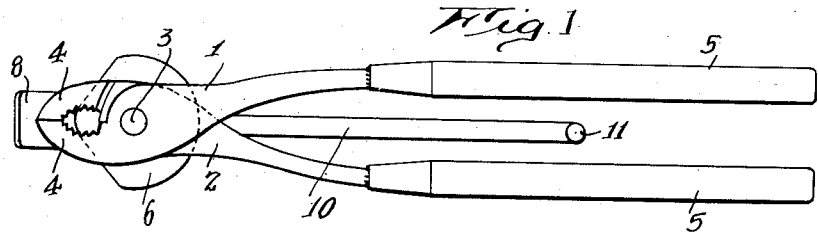
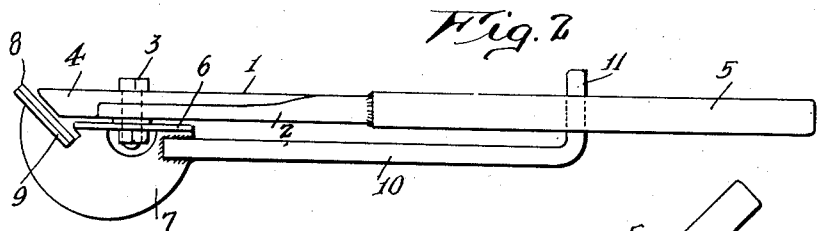
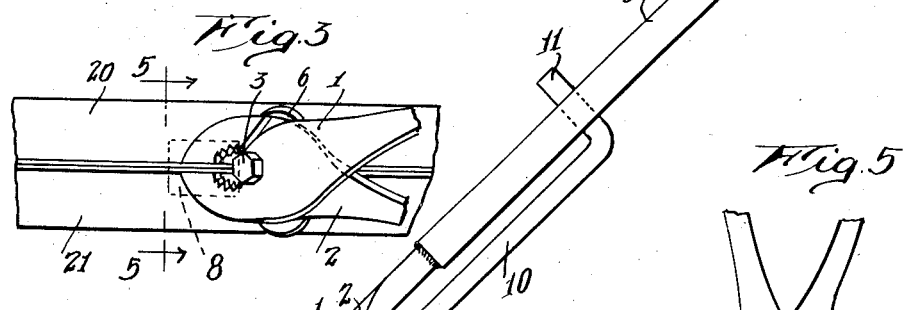
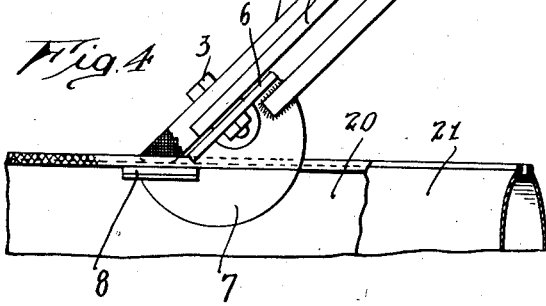
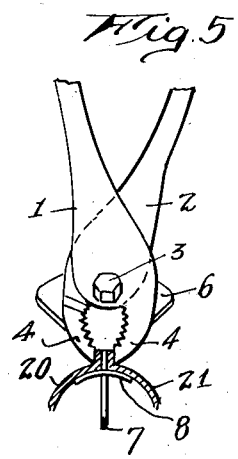
Inventors
Joseph R. Greene
Floyd A. Cox
By Lyon & Lyon
Attorneys Patented Aug. 31, 1943

2,328,271

UNITED STATES PATENT OFFICE 2,328,271

CLAMPING TOOL

Joseph R. Greene and Floyd A. Cox, San Diego, Calif., assignors to Solar Aircraft Company, San Diego, Calif., a corporation of California Application September 29, 1941, Serial No. 412,706

2 Claims. (Cl. 113—99)

This invention relates to clamping tools or pliers for holding parts together in desired relative positions, and is particularly useful for holding flanged metal parts while they are being welded together.

A broad object of the invention is to facilitate the welding or brazing together of metal parts.

A more specific object is to provide a particularly simple and convenient tool for temporarily holding flanged metal parts together.

Briefly, the present invention consists of a pair of pliers having the usual work-engaging jaws, plus a third member having a work-engaging face, at an angle to the faces of the jaws, for contacting the work and supporting it in a desired position, while it is engaged by the jaws. When the tool is employed for holding a pair of flanged members together, the third face functions to align the two flanged member while the flanges are engaged and held together by the jaws.

More specific objects and features of the invention will become apparent from the following detailed description of a particular embodiment thereof, as illustrated in the drawing:

In the drawing:

Fig. 1 is a plan view of a tool incorporating the invention;

Fig. 2 is a side elevation of the tool;

Fig. 3 is a plan view showing the tool being used to hold a pair of flanged members;

Fig. 4 is a side elevation of the assembly of Fig. 3, with portions of the workpiece broken away; and Fig. 5 is a detail section, taken in the plane V—V of Fig. 3.

Referring first to Figs. 1 and 2, our tool comprises a pair of identical plier members 1 and 2, respectively, which are pivotally secured together by a bolt 3. Each of the members 1 and 2 has a jaw 4 on one end and a handle 5 on the other end, the latter being of any convenient length. The plier construction as described is conventional, except that the pivot bolt 3, instead of serving only to interconnect the plier members 1 and 2, also engages and supports a disc-like element 6 for pivotal movement coaxial with the pivotal movement of the plier jaws.

The element 6 has secured thereto, as by welding, a flat element 7 which lies perpendicular to the element 6 and extends a substantial distance in front of the pivot bolt 3. Thus, as shown in Fig. 2, the extreme forward end of the element 7 is positioned slightly beyond the ends of the jaws 4. The function of this element 7 is to support a work-engaging plate 8 adjacent to the jaws 4. Accordingly, the element 7 is configured so as to have an edge 9 lying against the plate 8 and welded thereto.

The shape of the plate 8 can be varied to adapt the tool for various types of work. The tool is shown in Figs. 3, 4, and 5 adapted to hold together two curved, flanged members 20 and 21, respectively, under which condition the plate 8 is preferably curved (as clearly shown in Fig. 5) to conform to the inner surface of the members 20 and 21. On the other hand, if the tool is intended to be used for holding together flat, flanged members, then obviously, the plate 8 should be made flat to conform to the flat workpiece.

The flat element 7 constitutes the sole supporting element for the work-engaging plate 8 and should be strong enough to apply all needed force to the plate 8, but, at the same time, should be as thin as possible, so as not to interfere any more than necessary with the work. Thus, it will be observed from an inspection of Figs. 4 and 5, that the element 7 projects between the two workpieces 20 and 21 and maintains a separation between them. The tool is usually employed on relatively thin workpieces that will yield, so that the flanges can be brought completely together by the plier jaws 4, even though the flanges are separated a short distance away from the jaws 4 by the element 7. Nevertheless, it is obvious that it is desirable to have the element 7 as thin as possible. In order to permit the thinnest possible construction and still retain sufficient strength, the element 7 is preferably made of relatively large dimensions in its plane.

The unit consisting of the members 6, 7 and 8 is pivotally supported on the pivot bolt 3 on the plier members 1 and 2 so that it is freely rotatable. Ordinarily, when the tool is in use, the work-engaging plate 8 is self-centering. However, to limit swinging movement of the assembly and permit manual adjustment of its position, when desired, a handle 10 may be mounted on the element 7. As shown in Fig. 2, the handle 10 is positioned below the level of the handles 5, but has an upturned end 11 which projects between the handles 5, so as to always retain the handle 10 in a position somewhere between the two handles 5.

It is usually desirable to provide small clearance between the plier jaws 4 and the plate 8, the clearance being preferably approximately equal to the thickness of the sheet metal with which the tool is to be used. It is also desirable to so configure the jaws 4 that the edges of the jaws extend substantially parallel to the plate 8, as shown in Fig. 2.

A pair of workpieces, such as indicated at 20 and 21 in Figs. 3, 4 and 5, can be readily welded, brazed or soldered together while held in proper relative positions by the present tool.

Although for the purpose of explaining the invention a specific embodiment thereof has been described and illustrated in detail, it will be obvious to those skilled in the art that various departures from the specific construction shown can be made without departing from the invention, and the latter is to be limited only to the extent set forth in the appended claims.

We claim:

1. A tool of the type described, comprising: a pair of members, each having a jaw thereon, and pivot means securing them together for swinging movement into and out of a work-clamping position, handle means on said members for moving them, a third work-engaging member adapted to support a workpiece in a different direction than said jaws support it, a hub member pivotally supported, with respect to said pair of members, by said pivot means, and a connecting means extending between and secured to both said third work-supporting element and said hub member, and consisting of a thin, flat member normally positioned substantially in the plane of the faces of said jaws when the latter are in closed position.

2. A tool of the type described, comprising: a pair of jaw members having juxtaposed work-engaging faces adapted to clamp a workpiece therebetween and pivot means hinging them together for swinging movement into and out of work-clamping position, handle means on said jaw members for moving them, an auxiliary work-supporting member having a work-contacting surface of substantial area positioned substantially perpendicular to the work-engaging faces of said jaw members and closely adjacent the outer edges thereof, said auxiliary member being pivotally supported by said pivot means from said jaw members for hinge movement only with respect thereto, whereby said auxiliary member can remain stationary in engagement with a workpiece while said jaw members are swinging into and out of work-clamping position.

JOSEPH R. GREENE.
FLOYD A. COX.